United States Patent
Fan

(10) Patent No.: US 12,501,199 B2
(45) Date of Patent: Dec. 16, 2025

(54) POWER CIRCUIT FOR WIRELESS EARPHONE

(71) Applicant: Harman International Industries, Incorporated, Stamford, CT (US)

(72) Inventor: Linyong Fan, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 392 days.

(21) Appl. No.: 18/105,017

(22) Filed: Feb. 2, 2023

(65) Prior Publication Data

US 2023/0188882 A1   Jun. 15, 2023

Related U.S. Application Data

(63) Continuation of application No. PCT/CN2020/109128, filed on Aug. 14, 2020.

(51) Int. Cl.
*H04R 1/10* (2006.01)
*H02J 7/00* (2006.01)

(52) U.S. Cl.
CPC .......... *H04R 1/1025* (2013.01); *H02J 7/0031* (2013.01); *H02J 7/0044* (2013.01); *H04R 1/1041* (2013.01); *H04R 2420/07* (2013.01)

(58) Field of Classification Search
CPC ................ H04R 1/1025; H04R 1/1041; H04R 2420/07; H02J 7/0031; H02J 7/0044
USPC ....................................................... 381/150
See application file for complete search history.

(56) References Cited

U.S. PATENT DOCUMENTS

| | | | |
|---|---|---|---|
| 2005/0077870 A1* | 4/2005 | Ha | H02J 7/0044 320/114 |
| 2020/0186909 A1 | 6/2020 | Shen | |
| 2020/0195031 A1 | 6/2020 | Weng et al. | |

FOREIGN PATENT DOCUMENTS

| | | |
|---|---|---|
| CN | 108242839 | 7/2018 |
| CN | 109511035 | 3/2019 |
| CN | 209184282 | 7/2019 |
| CN | 110572736 | 12/2019 |
| CN | 110602598 | 12/2019 |
| CN | 110740401 | 1/2020 |
| CN | 210112248 | 2/2020 |
| JP | 2020057929 | 4/2020 |

OTHER PUBLICATIONS

International Search Report issued in corresponding International Application PCT/CN2020/109128, mailed May 12, 2021.

(Continued)

*Primary Examiner* — Sean H Nguyen
(74) *Attorney, Agent, or Firm* — Burris Law, PLLC

(57) ABSTRACT

A power circuit for a wireless earphone includes a first charging terminal, a second charging terminal, a charger, a battery circuit, and a control circuit. The charger is enabled via a voltage across the first charging terminal and the second charging terminal. The battery circuit is connected to the charger. The control circuit is connected to the first charging terminal and the battery circuit. The control circuit is configured to enable or disable with a supply of power from the battery circuit based on a control signal provided by the first charging terminal.

18 Claims, 3 Drawing Sheets

(56) References Cited

OTHER PUBLICATIONS

Office Action issued in corresponding CN Application 202080104013.7, issued Dec. 20, 2024, and English translation thereof, 14 pages.
Extended European Search Report issued in corresponding EP Application 20949124.0 issued Apr. 19, 2024, 6 pages.
Fundaro et al., Battery Management Solutions for Cost-Sensitive Applications, Benchmarq Microelectronics, Inc., IEEE, 1998, pp. 169-173.
Office Action issued in corresponding CN Application 202080104013.7, issued Jun. 25, 2025, and English translation thereof, 16 pages.

* cited by examiner

POWER CIRCUIT FOR WIRELESS EARPHONE

CROSS-REFERENCE TO RELATED APPLICATIONS

This application is a continuation of International Application No. PCT/CN2020/109128, filed on Aug. 14, 2020. The disclosure of the above application is incorporated herein by reference.

FIELD

The present disclosure relates to a power circuit, and specifically relates to a power circuit for a wireless earphone.

BACKGROUND

The statements in this section merely provide background information related to the present disclosure and may not constitute prior art.

With the rapid development of wireless technology, the use of wireless earphones has become more widespread. The wireless earphone may be equipped with a corresponding charging box for receiving and charging the wireless earphone. When the earphone is put into the charging box, most of the circuits and components in the wireless earphone circuit are still consuming power, thereby resulting in low charging efficiency.

These issues with charging boxes, among other issues, are addressed by the present disclosure.

SUMMARY

This section provides a general summary of the disclosure and is not a comprehensive disclosure of its full scope or all of its features.

According to one or more embodiments of the disclosure, a power circuit for a wireless earphone is provided. The power circuit comprises a charger enabled via a voltage across a first charging terminal and a second charging terminal. The power circuit comprises a battery circuit connected to the charger. The power circuit comprises a control circuit connected to the first charging terminal and the battery circuit, where the control circuit is configured to enable or disable with a supply of power from the battery circuit based on a control signal provided by the first charging terminal.

The following paragraph includes variations of the power circuit of the above paragraph, and the variations may be implemented individually or in any combination while remaining within the scope of the present disclosure.

In one embodiment, the control circuit comprises a switch circuit. In one embodiment, the switch circuit is a metal-oxide-semiconductor field-effect transistor (MOSFET) switch comprising a gate, a drain, and a source, where the gate is connected to the first charging terminal, the drain is connected to an output of the battery circuit, and the source is connected to a post-stage circuit. In one embodiment, the switch circuit is an electronic switch comprising a control terminal, an input terminal, and an output terminal, where the control terminal is connected to the first charging terminal, the input terminal is connected to an output of the battery circuit, and the output terminal is connected to a post-stage circuit. In one embodiment, the switch circuit is a positive-negative-positive (PNP) transistor switch comprising a base, an emitter, and a collector, where the base is connected to the first charging terminal, the emitter is connected to an output of the battery circuit, and the collector is connected to a post-stage circuit. In one embodiment, the output of the switch circuit is connected to a reset circuit for resetting the wireless earphone. In one embodiment, the first charging terminal and the second charging terminal are configured to connect to a charging box. In one embodiment, wherein the control circuit comprises a switch circuit, the switch circuit is turned off based on the control signal when the wireless earphone is put into the charging box, and the switch circuit is turned on based on the control signal when the wireless earphone is taken out of the charging box, and in response to the switch circuit being turned on, the battery circuit supplies power for a post-stage circuit and the wireless earphone is reset. In one embodiment, the second charging terminal is grounded.

According to one or more embodiments of the disclosure, a power circuit for a wireless earphone is provided. The power circuit comprises a charger enabled via a voltage across a first charging terminal and a second charging terminal. The power circuit comprises a battery circuit connected to the charger. The power circuit comprises a post-stage circuit comprising a regulator circuit. The power circuit comprises a control circuit connected to the first charging terminal and the battery circuit, where the control circuit comprises a switch circuit, and where the control circuit is configured to enable or disable with a supply of power from the battery circuit based on a control signal provided by the first charging terminal.

The following paragraph includes variations of the power circuit of the above paragraph, and the variations may be implemented individually or in any combination while remaining within the scope of the present disclosure.

In one embodiment, the switch circuit is a metal-oxide-semiconductor field-effect transistor (MOSFET) switch comprising a gate, a drain, and a source, where the gate is connected to the first charging terminal, the drain is connected to an output of the battery circuit, and the source is connected to the post-stage circuit. In one embodiment, the switch circuit is an electronic switch comprising a control terminal, an input terminal, and an output terminal, where the control terminal is connected to the first charging terminal, the input terminal is connected to an output of the battery circuit, and the output terminal is connected to the post-stage circuit. In one embodiment, the switch circuit is a positive-negative-positive (PNP) transistor switch comprising a base, an emitter, and a collector, where the base is connected to the first charging terminal, the emitter is connected to an output of the battery circuit, and the collector is connected to the post-stage circuit. In one embodiment, the output of the switch circuit is connected to a reset circuit for resetting the wireless earphone. In one embodiment, the first charging terminal and the second charging terminal are configured to connect to a charging box. In one embodiment, the switch circuit is turned off based on the control signal when the wireless earphone is put into the charging box, and the switch circuit is turned on based on the control signal when the wireless earphone is taken out of the charging box, and in response to the switch circuit being turned on, the battery circuit supplies power for a post-stage circuit and the wireless earphone is reset. In one embodiment, the second charging terminal is grounded.

According to one or more embodiments of the disclosure, a wireless earphone is provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
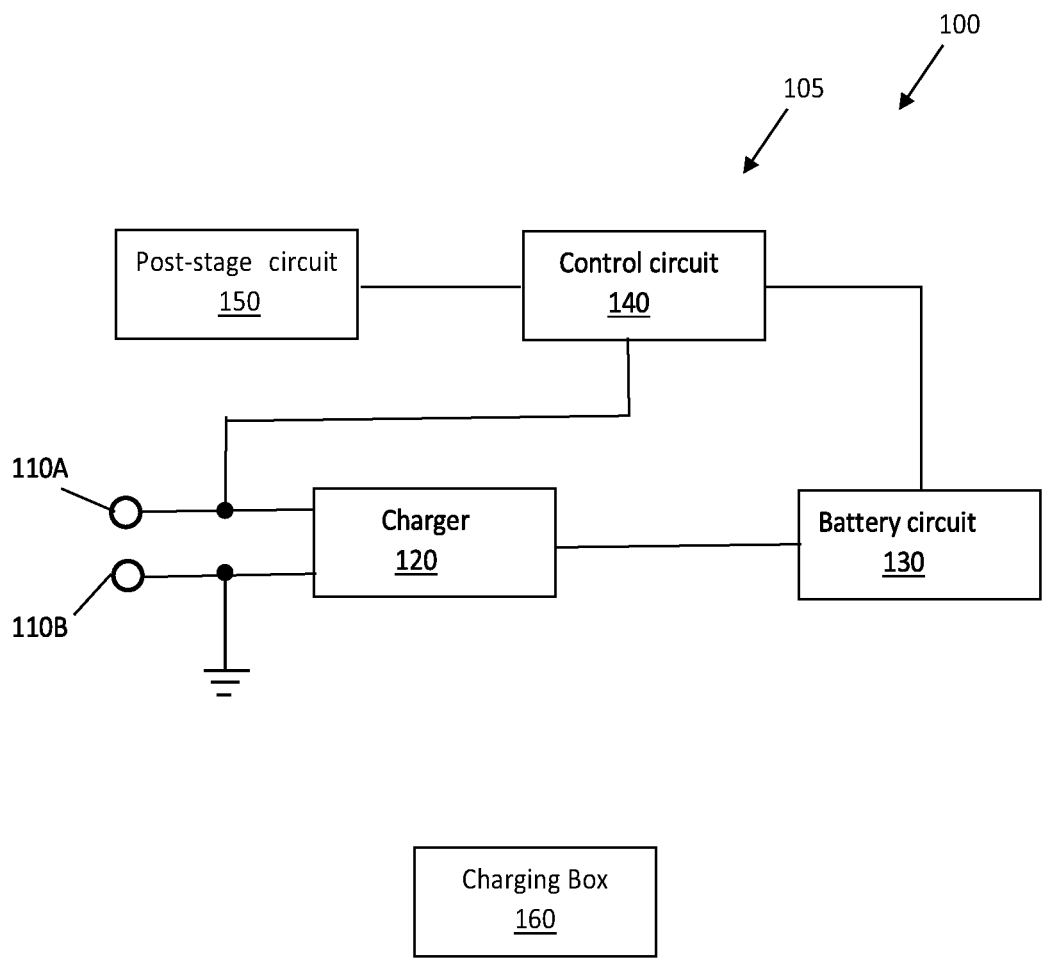
FIG. 1 illustrates a schematic block diagram of a power circuit of a wireless earphone in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Examples will be provided below for illustration. The descriptions of the various examples will be presented for purposes of illustration, but are not intended to be exhaustive or limited to the embodiments disclosed. Many modifications and variations will be apparent to those of ordinary skill in the art without departing from the scope and spirit of the described embodiments.

FIG. 1 illustrates a schematic block diagram of the power circuit in the earphone in accordance with one or more embodiments of the present disclosure.

As shown in FIG. 1, a power circuit 105 for a wireless earphone 100 comprises a first charging terminal 110A, a second charging terminal 110B, a charger 120, a battery circuit 130, a control circuit 140, and a post-stage circuit 150.

The charger 120 controls a charging process for the battery circuit 130. For example, the charger 120 may be enabled via a voltage across the first charging terminal 110A and the second charging terminal 110B, and the charger 120 may then charge the battery circuit 130. The first charging terminal 110A and the second charging terminal 110B may be electrically connected to a corresponding charging box 160 when the wireless earphone 100 is put into or disposed within the charging box 160. For illustration, FIG. 1 shows that the second charging terminal 110B is grounded. The control circuit 140 may be further connected to the first charging terminal 110A and the battery circuit 130, and the control circuit 140 may enable or disable power supplied from the battery circuit 130 based on a control signal provided by the first charging terminal 110A. When the wireless earphone 100 is put into the charging box, the voltage level at the first charging terminal is a high level, and the voltage across the first charging terminal 110A and the second charging terminal 110B is greater than zero. Then, the charger 120 may control the charging process and begin to charge the battery circuit 130. The first charging terminal 110A further provides the control signal to the control circuit 140. Based on the control signal, the control circuit 140 enables or disables supplying with power from the battery circuit. Additional details regarding the post-stage circuit 150 are provided below.

Figure 2:
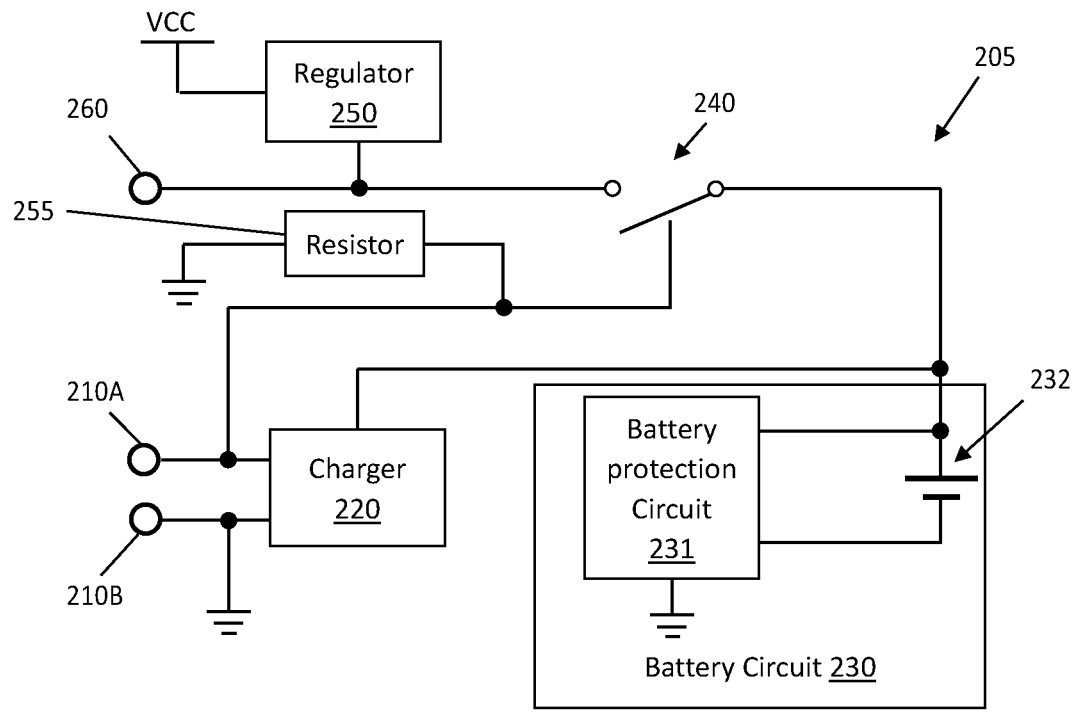
FIG. 2 illustrates a schematic block diagram of a power circuit of a wireless earphone in accordance with one or more embodiments of the present disclosure.

FIG. 2 illustrates a schematic block diagram of another example power circuit 205 in accordance with one or more embodiments of the present disclosure. As shown in FIG. 2, the power circuit 205 comprises a first charging terminal 210A, a second charging terminal 210B, a charger 220, a battery circuit 230, a switch circuit 240, a regulator 250, a resistor 255, and a reset terminal 260.

The second charging terminal 210B may be electrically connected to the charger 220, and the charger 220 may charge the battery circuit 230, which comprises a battery protection circuit 231 and a battery 232. The first charging terminal 210A may be grounded via the resistor 255. The voltages at the first charging terminal 210A and the second charging terminal 210B may be respectively referred to hereinafter as "Vcha+" and "Vcha−". The battery 232 is a power source. The battery protection circuit 231 prevents the battery 232 from over charging, over discharging, over current, and so on. The switch circuit 240 is controlled by a control signal from the first charging terminal 210A. For example, the control signal may be a voltage level signal. When the voltage level signal indicates a high level, the switch circuit 240 is turned off, and when the voltage level signal indicates a low level, the switch circuit 240 is turned on. The regulator 250 may change the battery voltage to a proper voltage for other components (which are not shown), and a reset terminal 260 is employed to reset the earphone 100. When a voltage at the reset terminal 260 (hereinafter referred to as "Vbat") is a high level, the earphone 100 may be reset. For purpose of clear illustration, the regulator, the reset terminal, and other components (not shown), which are powered by the battery circuit 230, may be referred to as "a post-stage circuit" hereinafter.

When the wireless earphone is put into or disposed within the charging box, the first charging terminal 210A and the second charging terminal 210B may be electrically connected to the charging box, and the voltage level "Vcha+" at the first charging terminal 210A may be a high level. The control signal from the charging terminal 210A is a high-level signal, and the switch circuit 240 is turned off. As such, the power of the battery 232 will not go through the switch circuit 240, and the post-stage circuit cannot be supplied with power from the battery 232. For example, when the voltage level at the reset terminal 260 (Vbat) is 0, the regulator 250 does not work, and all the components powered by a voltage common collector (VCC in FIG. 2) are turned off. When the wireless earphone 100 is taken out of or removed from the charging box, the control signal becomes a low-level signal, and the switch circuit 240 is turned on. As such, the power of the battery 232 goes through the switch circuit 240 and supplies power for the post-stage circuit. The voltage Vbat becomes high when the earphone 100 is reset, for example, the earphone is transitioning from being powered off to powered on.

Figure 3:
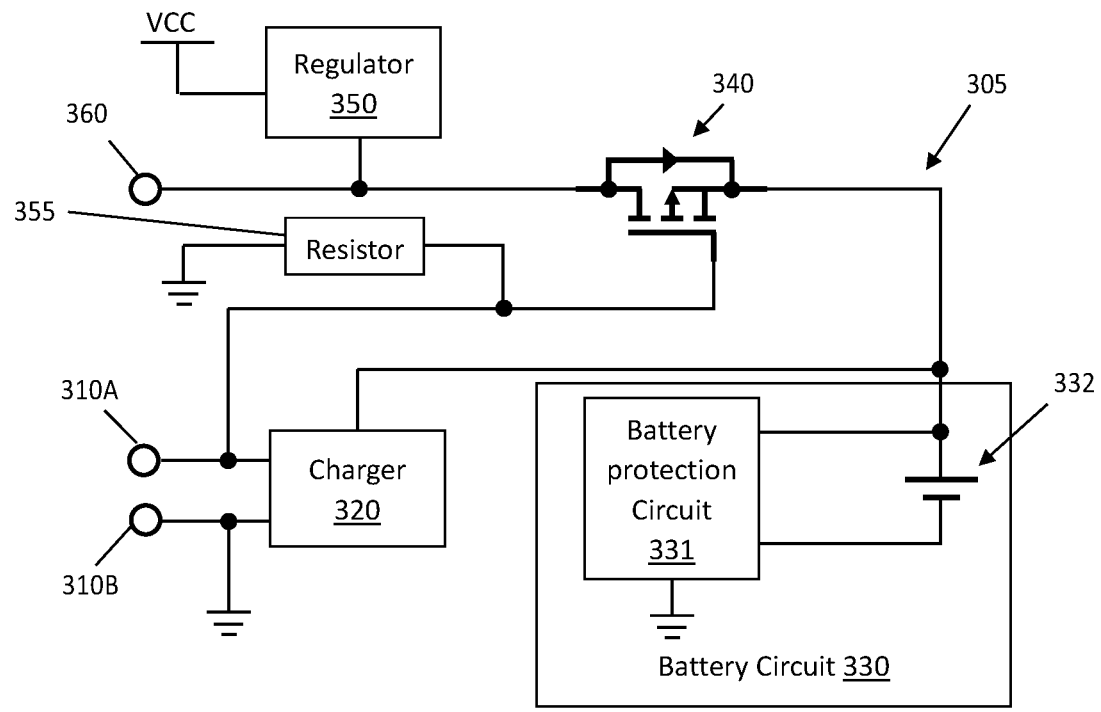
FIG. 3 illustrates a schematic block diagram of a power circuit of a wireless earphone in accordance with one embodiment of the present disclosure.
Figure 4:
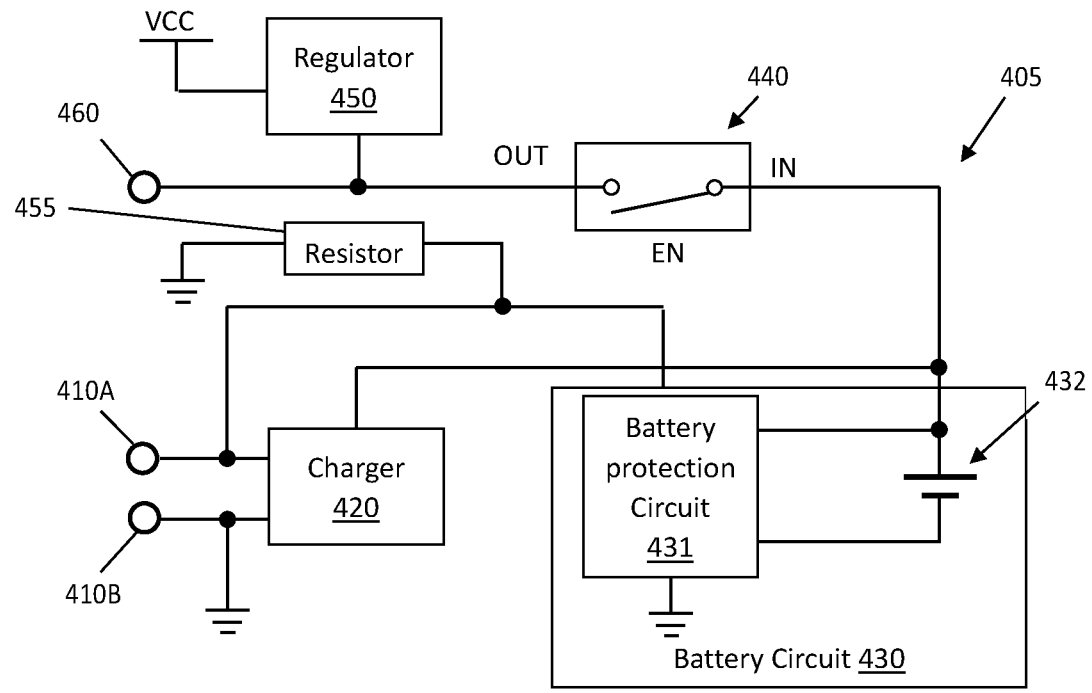
FIG. 4 illustrates a schematic block diagram of a power circuit of a wireless earphone in accordance with another embodiment of the present disclosure.
Figure 5:
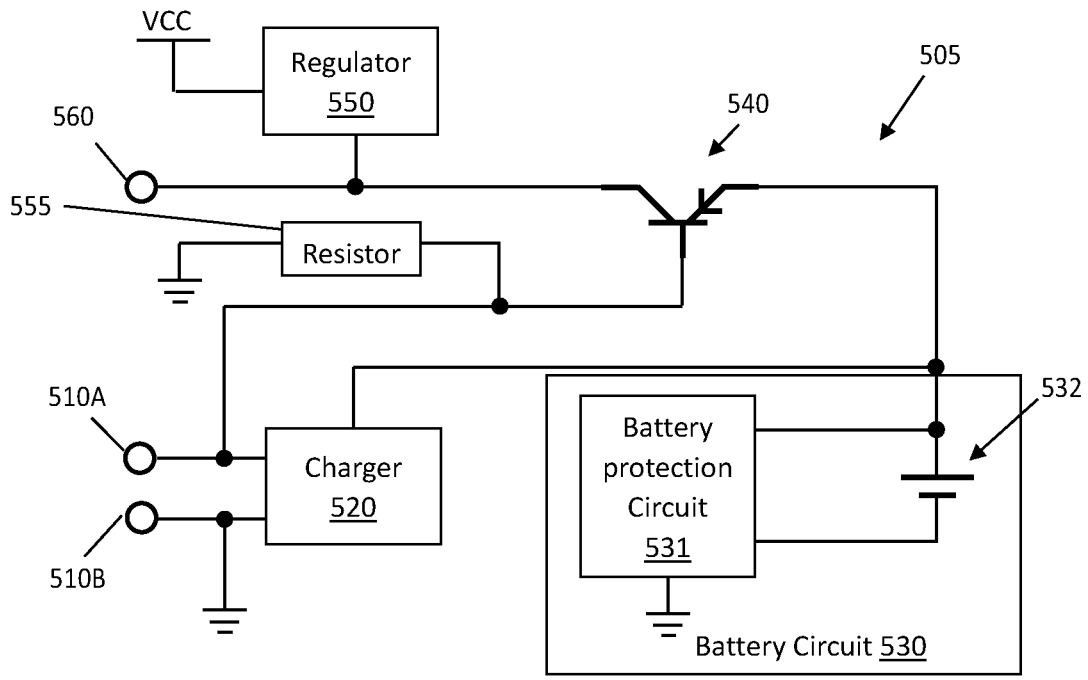
FIG. 5 illustrates a schematic block diagram of a power circuit of a wireless earphone in accordance with yet another embodiment of the present disclosure.

FIGS. 3-5 illustrates different power circuits in the earphone in accordance with one or more embodiments of the present disclosure, where the switch circuit may be respectively implemented as a p-channel metal-oxide-semiconductor field-effect transistor (hereinafter referred to as a "p-MOSFET switch"), an electronic switch, and a transistor positive-negative-positive (PNP) switch.

With reference to FIG. 3, a power circuit 305 includes a first charging terminal 310A, a second charging terminal 310B, a charger 320, a battery circuit 330, a p-MOSFET switch 340, a regulator 350, a resistor 355, and a reset terminal 360. The p-MOSFET switch 340 controls the supply from the battery circuit 330, which comprises a battery protection circuit 331 and a battery 332. A gate of the p-MOSFET switch 340 is connected to the first charging terminal 310A, a drain of the p-MOSFET switch 340 is connected to an output of the battery circuit 330, and a source of the p-MOSFET switch 340 is connected to a post-stage circuit, and as such, the source may be connected to the regulator 350, the reset terminal 360, and other components (not shown) of the power circuit 305. The second charging terminal 310B is grounded, and the first charging terminal 310A may be grounded via the resistor 355. The charger 320 controls the charging process via a voltage across the first charging terminal 310A and the second terminal 310B.

When the wireless earphone is put into or disposed within the charging box, the voltage level Vcha+ at the first charging terminal 310A is high. The control signal from the first charging terminal 310A is a high level signal, and the gate of the p-MOSFET switch 340 will be high. Thus, the p-MOSFET switch 340 is disabled. The power of the battery 332 will not go through the p-MOSFET switch 340. Thus, the post-stage circuit cannot be supplied with power from the battery 332. For example, when the voltage level at the reset terminal 360 (Vbat) is 0, the regulator 350 does not work, and all the components powered by the VCC are turned off. When the wireless earphone is taken out of or removed from the charging box, the control signal becomes a low level signal, and the gate of the p-MOSFET switch 340 will be low. The p-MOSFET switch 340 is therefore enabled. The power of the battery 332 goes through the p-MOSFET switch 340 and may supply power for the post-stage circuit. The voltage Vbat becomes high and it resets the earphone when, for example, the earphone 100 is reset and transitions from being powered off to powered on.

With reference to FIG. 4, a power circuit 405 includes a first charging terminal 410A, a second charging terminal 410B, a charger 420, a battery circuit 430, an electronic switch 440, a regulator 450, a resistor 455, and a reset terminal 460. The electronic switch 440 controls the supply from the battery circuit 430, which may comprise a battery protection circuit 431 and a battery 432. A controlling terminal, i.e., an enable pin (EN) of the electronic switch 440, is connected to the first charging terminal 410A, an input (IN) of the electronic switch 440 is connected to an output of the battery circuit 430, and an output (OUT) of the electronic switch 440 is an input of a post-stage circuit. As such, the output of the electronic switch 440 may be an input of the regulator 450, the reset terminal 460, and other components (not shown) of the power circuit 405. The second charging terminal 410B is grounded, and the first charging terminal 410A may be grounded via the resistor 455. The charger 420 controls the charging process via a voltage across the first charging terminal 410A and the second terminal 410B.

When the wireless earphone is put into or disposed within the charging box, the voltage level at the first charging terminal 410A (Vcha+) becomes a high level. The control signal from the charging terminal 410A is a high level signal, and the enable pin (EN) of the electronic switch 440 will be high. Accordingly, the electronic switch 440 is turned off, and power of the battery 432 will not go through the electronic switch 440. Thus, the post-stage circuit cannot be supplied with power from the battery 432. For example, when the voltage level at the reset terminal 460 (Vbat) is 0, the regulator 450 does not work, and the components powered by the VCC are turned off. When the wireless earphone 100 is taken out of or removed from the charging box, the control signal becomes a low level signal, and the enable pin (EN) of the electronic switch 440 will be low. Accordingly, the electronic switch 440 is turned on, and the power of the battery 432 goes through the electronic switch 440. Thus, the battery 432 may supply power for the post-stage circuit. The voltage level at the reset terminal 460 (Vbat) becomes high, which resets the earphone when, for example, the earphone is reset and transitions from being powered off to powered on.

With reference to FIG. 5, a power circuit 505 includes a first charging terminal 510A, a second charging terminal 510B, a charger 520, a battery circuit 530, a PNP transistor switch 540, a regulator 550, a resistor 555, and a reset terminal 560. The PNP transistor switch 540 controls the supply from the battery circuit 530, which may comprise a battery protection circuit 531 and a battery 532. The base of the PNP transistor switch 540 is connected to the first charging terminal 510A, the emitter of the PNP transistor switch 540 is connected to an output of the battery circuit 530, and the collector of the PNP transistor switch 540 is connected to a post-stage circuit. As such, the output the PNP transistor switch 540 may be connected to the regulator 550, the reset terminal 560, and other components (not shown) in the power circuit 505 of the wireless earphone. The second charging terminal 510B is grounded, and the first charging terminal 510A may be grounded via the resistor 555. The charger 520 controls the charging process via a voltage across the first charging terminal 510A and the second terminal 510B.

When the wireless earphone is put into or disposed within the charging box, the voltage level at the first charging terminal 510A (Vcha+) becomes a high level. The control signal from the first charging terminal 510A is a high level signal, and the base of the PNP transistor switch 540 will be high. Thus, the PNP transistor switch 540 is disabled. The power of the battery 532 will not go through the PNP transistor switch 540, and as such, the post-stage circuit cannot be supplied with power from the battery 532. For example, when the voltage at the reset terminal 560 (Vbat) is 0, the regulator 550 does not work, and the components powered by VCC are turned off. When the wireless earphone is taken out of or removed from the charging box, the control signal becomes a low level signal, and the base of the PNP transistor switch 540 will be low. The PNP transistor switch 540 thus may be enabled, and the power of the battery 532 goes through the PNP transistor switch 540. Accordingly, the battery 532 may supply power for the post-stage circuit. The voltage at the reset terminal 560 (Vbat) becomes high, which resets the earphone when, for example, the earphone is reset and transitions from being powered off to powered on.

Using the power circuits 205, 305, 405, 505 of this disclosure, when the wireless earphone 100 is put into or disposed within the charging box, the power of most components will be cut off, except for the chargers and the battery circuits. That is, the power consumption of the wireless earphone 100 is reduced when the earphone is in the charging box. As such, the charging efficiency of the wireless earphone 100 may be improved. Also, the wireless earphone 100 can be reset by being powered off and on when it is put into and taken out of the charging box.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference sign is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

While the foregoing is directed to embodiments of the present disclosure, other and further embodiments of the disclosure may be devised without departing from the basic scope thereof, and the scope thereof is determined by the claims that follow.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power circuit for a wireless earphone, the power circuit comprising:
    a charger enabled via a voltage across a first charging terminal and a second charging terminal;
    a battery circuit connected to the charger; and
    a switch circuit connected to the first charging terminal and the battery circuit, wherein the switch circuit is configured to enable or disable with a supply of power from the battery circuit based on a control signal provided by the first charging terminal; and
    a post-stage circuit connected to the switch circuit,
    wherein in response to the control signal having a first voltage magnitude that is greater than or equal to a turn-on voltage magnitude of the switch circuit, the switch circuit disables the supply of power from the battery circuit to the post-stage circuit, and
    wherein in response to the control signal having a second voltage magnitude that is less than the turn-on voltage magnitude of the switch circuit, the switch circuit enables the supply of power from the battery circuit to the post-stage circuit.

2. The power circuit according to claim 1, wherein the switch circuit is a metal-oxide-semiconductor field-effect transistor (MOSFET) switch comprising a gate, a drain, and a source, wherein the gate is connected to the first charging terminal, the drain is connected to an output of the battery circuit, and the source is connected to a post-stage circuit.

3. The power circuit according to claim 1, wherein the switch circuit is an electronic switch comprising a control terminal, an input terminal, and an output terminal, wherein the control terminal is connected to the first charging terminal, the input terminal is connected to an output of the battery circuit, and the output terminal is connected to a post-stage circuit.

4. The power circuit according to claim 1, wherein the switch circuit is a positive-negative-positive (PNP) transistor switch comprising a base, an emitter, and a collector, wherein the base is connected to the first charging terminal, the emitter is connected to an output of the battery circuit, and the collector is connected to a post-stage circuit.

5. The power circuit according to claim 1, wherein an output of the switch circuit is connected to a reset circuit for resetting the wireless earphone.

6. The power circuit according to claim 1, wherein the first charging terminal and the second charging terminal are configured to connect to a charging box.

7. The power circuit according to claim 6, wherein
the switch circuit is turned off based on the control signal when the wireless earphone is put into the charging box; and
the switch circuit is turned on based on the control signal when the wireless earphone is taken out of the charging box, and in response to the switch circuit being turned on, the battery circuit supplies power for the post-stage circuit and the wireless earphone is reset.

8. The power circuit according to claim 1, wherein the second charging terminal is grounded.

9. A wireless earphone including a power circuit according to claim 1.

10. A power circuit for a wireless earphone, the power circuit comprising:
a charger enabled via a voltage across a first charging terminal and a second charging terminal;
a battery circuit connected to the charger;
a post-stage circuit comprising a regulator circuit; and
a control circuit connected to the first charging terminal and the battery circuit, wherein the control circuit comprises a switch circuit, and wherein the control circuit is configured to enable or disable with a supply of power from the battery circuit based on a control signal provided by the first charging terminal,
wherein in response to the control signal having a first voltage magnitude that is greater than or equal to a turn-on voltage magnitude of the switch circuit, the switch circuit disables the supply of power from the battery circuit to the post-stage circuit, and
wherein in response to the control signal having a second voltage magnitude that is less than the turn-on voltage magnitude of the switch circuit, the switch circuit enables the supply of power from the battery circuit to the post-stage circuit.

11. The power circuit according to claim 10, wherein the switch circuit is a metal-oxide-semiconductor field-effect transistor (MOSFET) switch comprising a gate, a drain, and a source, wherein the gate is connected to the first charging terminal, the drain is connected to an output of the battery circuit, and the source is connected to the post-stage circuit.

12. The power circuit according to claim 10, wherein the switch circuit is an electronic switch comprising a control terminal, an input terminal, and an output terminal, wherein the control terminal is connected to the first charging terminal, the input terminal is connected to an output of the battery circuit, and the output terminal is connected to the post-stage circuit.

13. The power circuit according to claim 10, wherein the switch circuit is a positive-negative-positive (PNP) transistor switch comprising a base, an emitter, and a collector, wherein the base is connected to the first charging terminal, the emitter is connected to an output of the battery circuit, and the collector is connected to the post-stage circuit.

14. The power circuit according to claim 10, wherein an output of the switch circuit is connected to a reset circuit for resetting the wireless earphone.

15. The power circuit according to claim 10, wherein the first charging terminal and the second charging terminal are configured to connect to a charging box.

16. The power circuit according to claim 15, wherein
the switch circuit is turned off based on the control signal when the wireless earphone is put into the charging box; and
the switch circuit is turned on based on the control signal when the wireless earphone is taken out of the charging box, and in response to the switch circuit being turned on, the battery circuit supplies power for the post-stage circuit and the wireless earphone is reset.

17. The power circuit according to claim 10, wherein the second charging terminal is grounded.

18. A wireless earphone including a power circuit according to claim 10.

* * * * *